INVENTORS
GLENN P. ERICKSON
ARTHUR T. HENSHALL
BY
ATTORNEYS

United States Patent Office 3,277,478
Patented Oct. 4, 1966

3,277,478
TRANSPONDER REQUIRING DELAY PLUS SHORT
TIME DIFFERENTIALS
Glenn P. Erickson, Linthicum Heights, and Arthur T.
Henshall, Baltimore, Md., assignors to the United States
of America as represented by the Secretary of the Navy
Filed July 20, 1964, Ser. No. 384,011
4 Claims. (Cl. 343—17.7)

The present invention relates to a transponder and more particularly to a transponder for use in testing components of various electronics systems.

There exists a need in the art for a transponder, i.e., a unit which receives an interrogator signal and automatically transmits a reply which produces a long time delay (a few milliseconds) together with a short time differential (a few microseconds) for use in testing components of radar, sonar or other electronic system in which the measurement of time differentials is the objective. Time differentials in radar and sonar systems provide indications of range while in underwater systems the time differentials may be indicative of such parameters as water velocity.

Normally, testing of components or systems is accomplished through the use of delay lines which have been found to have several disadvantages. First, the cost of the delay lines and the physical size thereof increases with increased accuracy. Secondly, attenuation or reduction in the strength of the test signal increases with the delay time. Also the cost and physical size of the delay lines increase at a rapid rate with respect to an increased rise time. And finally, delay time and attenuation are frequency dependent.

An object of the present invention is to alleviate the aforesaid problems and provide a transponder wherein a short, accurate time differential is obtained following a relatively longer time delay.

An additional object is to provide a transponder wherein the only limit to the differential delay is attenuation and attenuation in the differential delay producing elements is constant.

A still further object of the present invention is to provide a transponder wherein a short, accurate time differential is obtained following a relatively longer time delay and wherein the differential delay is constant and the long time delay and the differential delay are completely independent.

A still further object of the present invention is to provide a transponder wherein the long time delay and the differential delay can be controlled separately and the delays can be achieved at small cost and with very small physical size.

Figure 1:
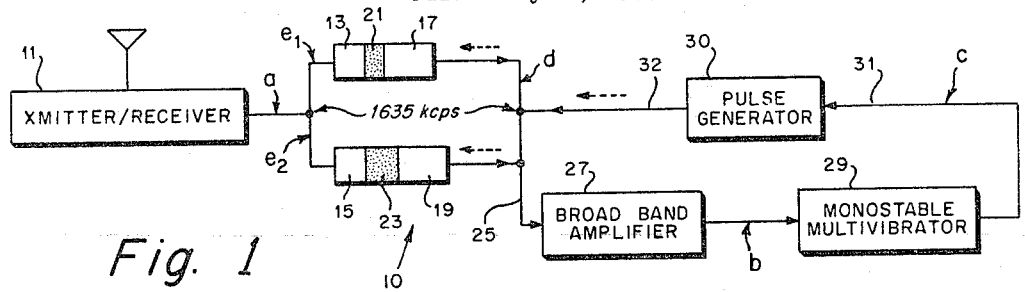
Figure 2:
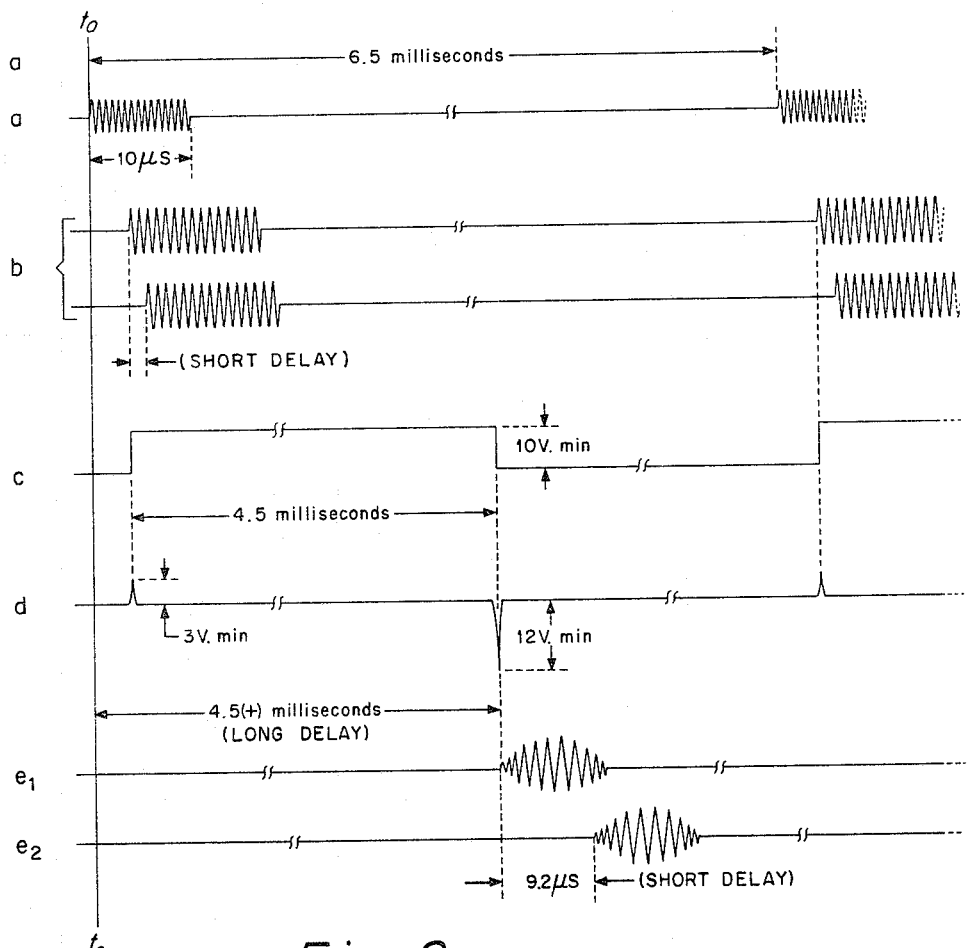

These and other objects and features of the invention will become apparent to those skilled in the art as the disclosure is made in the following description of an embodiment of the invention as illustrated in the accompanying sheet of drawing in which:

FIG. 1 represents a schematic block diagram of the transponder of the present invention; and FIG. 2 represents various waveforms obtained from FIG. 1.

For purposes of the present invention, the transponder generally noted at 10 is used to test the component generally indicated at 11 which for purposes of the present embodiment may be considered a transmitter-receiver such as the type used in a pinging type sonar or used in a water velocity measuring system. In the latter, the primary function of the transponder is to simulate a water velocity. The transponder receives the transmitted signal from the water velocity subsystem, inserts a sound velocity delay and a differential delay between individual transducers, and transmits the signal to the water velocity system which interprets the signal as a water velocity. The delay represents a static condition similar to a specific sea condition and results in an indication on a display device not shown.

The transmitter receiver 11 is electrically coupled to a pair of transducers 13 and 15 each consisting of a piezoelectric element such as lead titanate zirconate housed in a Lucite cup. A pair of transducer adapters 17 and 19 identical to the transducer elements 13 and 15 are interconnected to the transducer elements 13 and 15 through delay producing elements 21 and 23, respectively. Element 21 is constructed of any plastic material such as Lucite or the like and is cemented or otherwise bonded to piezoelectric elements 13 and 17. Element 23 is of material similar to that of element 21 but is of thicker configuration and is also cemented or otherwise bonded to piezoelectric elements 15 and 19. It is this difference in thickness between the Lucite elements 21 and 23 which achieves the short time differential shown in FIG. 2, line $b$ and designated short delay. For purposes of illustration a 9.2 microsecond time differential is achieved in the present application by a differential in thickness between elements 21 and 23 of one-half of an inch. It should again be noted that the material used to achieve the differential delay need not be Lucite but that other plastics of a similar type might be used to obtain the same results.

Piezoelectric crystals 17 and 19 are electrically coupled through conductor 25 to a broadband amplifier 27. The broadband amplifier 27 is of the type known and used in the art and is electrically interconnected with a monostable multivibrator 29 which in turn is connected to pulse generator 30 through conductor 31. Pulse generator 30 in turn is connected to piezoelectric crystals 17 and 19 through connector 32.

In operation, and for illustrative purposes only, the transmitter-receiver 11 transmits a 1635 kc. p.s. burst of electrical energy every 6.5 milliseconds (see line $a$ of FIG. 2). This RF packet lasts about ten microseconds and is between one and four volts peak to peak in amplitude. This signal is applied to the piezoelectric elements 13 and 15 and the signal applied to element 15 is delayed a few microseconds because of the thicker Lucite element 23 in the adapter. However, this delay serves no functional purpose at this point in the cycle of operation. The first signal to arrive at the transponder is amplified by the broadband amplifier 27, the output of which is used to trigger the monostable multivibrator 29.

The output of this multivibrator 29 (line $c$ of FIG. 2) is a rectangular wave of approximately 4.5 milliseconds duration, this being representative of the desired long time delay.

The edge of the monostable multivibrator, occurring 4.5 milliseconds after the initial trigger time ($t_0$), is used to trigger the pulse generator 30 which generates a narrow pulse (see line $d$ of FIG. 2) having a steep leading edge. This pulse is applied to and excites the piezoelectic adapter elements 17 and 19 which simultaneously emit a 1635 kc. p.s. RF pulse which is received by the receiver 11. The frequency of the RF signal emitted from the piezoelectric adapter elements 17 and 19 is determined by the resonant frequency of the elements which depend inter alia upon the element dimensions. The duration of the RF signal is determined by the Q (inductive reactance divided by the series resistance) of the element and the degree of damping applied thereto. Accordingly, to emit a pulse from the piezoelectric elements of a frequency equal to that transmitted by the transmitter-receiver 11, it is necessary to select piezoelectric adapter elements of the appropriate resonant frequency for each different frequency transmitted by the transmitter-receiver 11. The output wave shapes as shown in FIG. 2, lines $e_1$ and $e_2$ illustrate typical signals from a resonant circuit in which there is a gradual build-up of signal as a result of the narrow pulse applied to the elements and a gradual decay as established by the Q and the damping thereto after the cessation of the narrow pulse. In the case of the adapter 19 having a thicker Lucite, the RF pulse is delayed before receipt by the transmitter-receiver 11. This delay appears in the system as a time differential. (See lines $e_1$ and $e_2$ of FIG. 2.) This long time delay and short time differential is measured by the equipment being tested, such measuring components not being shown, and a comparison made between the known, preset delay values and the measurements obtained. Any deviation would reflect error in the equipment being tested.

It should be understood that a polarity difference is used to achieve isolation between the amplifier 27 and the pulse generator 30.

By reason of the present invention a device is obtained which utilizes a long time delay (here of 4.5 milliseconds) with a following short time differential (here 9.2 microseconds) wherein the differential does not change between pulses, over long periods of time or with temperature changes. It is understood that various time differentials may be achieved by utilizing various thicknesses of Lucite or other plastic material.

Obviously, many modifications and variations of the present invention are possible in the light of the above teachings. It is, therefore, to be understood that, within the scope of the appended claims, the invention may be practiced otherwise than as specifically described.

What is claimed is:

1. A transponder for producing a long time delay and a short time differential for a signal transmitted by a transmitter and for application to a receiver comprising:

a first and second transducer each having first and second terminals, said first terminals simultaneously receiving a signal from said transmitter and providing output signals at said second terminals in response thereto, said second transducer including means for delaying a received signal, means receiving said output signals from said transducers for delaying the output signal from said first transducer for an interval of time greater than that caused by said second transducer and means responsive to the delay signal for generating a signal for application to said second terminals of said transducers, whereby an output is received at said first terminals of said transducers for application to said receiver indicative of a long time delay and a short time differential.

2. The transponder as defined in claim 1 wherein said means receiving said output signals and said means responsive to the delayed signal includes:

amplifier means amplifying said output signals, multivibrator means receiving the amplified signals and being triggered by the amplified signal from said first transducer and producing a square wave in response thereto, pulse generator means triggered by the trailing edge of said square wave for supplying an output simultaneously to said second terminals of said transducers.

3. The transponder as defined in claim 2 wherein:

said first transducer includes a piezoelectric element and a first plastic element bonded thereto, and said second transducer includes a piezoelectric element and a second plastic element of a predetermined thickness differing from that of said first plastic element bonded thereto.

4. The transponder as defined in claim 3 wherein:

said piezoelectric elements are housed within a Lucite cup and said plastic elements are formed of Lucite.

No references cited.

CHESTER L. JUSTUS, *Primary Examiner.*

P. M. HINDERSTEIN, *Assistant Examiner.*